(12) United States Patent
Linne et al.

(10) Patent No.: US 9,782,943 B2
(45) Date of Patent: Oct. 10, 2017

(54) METHOD FOR MAKING A VEHICLE TIRE

(71) Applicant: Continental Reifen Deutschland GmbH, Hannover (DE)

(72) Inventors: Stefan Linne, Wedemark (DE); Sebastian Reitmann, Hagenburg (DE); Martin Gerighausen, Barsinghausen (DE)

(73) Assignee: Continental Reifen Deutschland GmbH, Hannover (DE)

( * ) Notice: Subject to any disclaimer, the term of this patent is extended or adjusted under 35 U.S.C. 154(b) by 0 days.

(21) Appl. No.: 15/143,287

(22) Filed: Apr. 29, 2016

(65) Prior Publication Data

US 2016/0236434 A1    Aug. 18, 2016

Related U.S. Application Data

(63) Continuation of application No. PCT/EP2014/066032, filed on Jul. 25, 2014.

(30) Foreign Application Priority Data

Oct. 29, 2013   (DE) .................. 10 2013 221 971

(51) Int. Cl.
*B29D 30/32*     (2006.01)
*B29D 30/72*     (2006.01)
(Continued)

(52) U.S. Cl.
CPC ............. *B29D 30/72* (2013.01); *B29D 30/20* (2013.01); *B29D 30/32* (2013.01); *B29D 30/36* (2013.01);
(Continued)

(58) Field of Classification Search
CPC ................... B29D 30/18; B29D 30/32; B29D 2030/2614; B29D 2030/2628;
(Continued)

(56) References Cited

U.S. PATENT DOCUMENTS 4,830,693 A  *  5/1989  Okafuji .................. B29D 30/32
                                                         156/132

FOREIGN PATENT DOCUMENTS

DE        1 753 663 A1     3/1972
DE        199 42 220 A1    3/2001
(Continued)

OTHER PUBLICATIONS

Machine translation and Derwent abstract for DE 19942220A1, patent document published Mar. 8, 2001.*

(Continued)

*Primary Examiner* — Geoffrey L Knable
(74) *Attorney, Agent, or Firm* — Walter Ottesen, P.A.

(57) ABSTRACT

A method for making a vehicle tire in which a tire carcass is expanded radially on a shaping drum, wherein the sidewalls arranged on the tire carcass are turned up by inflatable shaping bladders. This involves moving two pusher bells, which are arranged to the sides of the tire carcass, in the direction of the center of the blank, wherein the pusher bells are respectively mounted on a movable first and second carriage and are respectively moved in the axial direction by a first and second drive by way of a coupling, wherein the pusher bells are pressed laterally against the shaping bladders. When disequilibrium of forces on the two sides of the shaping bladders is set, the pressing positions of the two pusher bells are balanced, the two drives being arranged on a freely mounted third carriage.

11 Claims, 3 Drawing Sheets

(51) Int. Cl.
   *B29D 30/20*    (2006.01)
   *B29D 30/36*    (2006.01)
   B29D 30/26      (2006.01)
   B29K 105/00     (2006.01)
(52) U.S. Cl.
   CPC ............... *B29D 2030/2614* (2013.01); *B29D 2030/3228* (2013.01); *B29D 2030/3242* (2013.01); *B29K 2105/253* (2013.01)
(58) Field of Classification Search
   CPC .... B29D 2030/3228; B29D 2030/3242; B29D 2030/325
   See application file for complete search history.

(56) References Cited

FOREIGN PATENT DOCUMENTS

| | | |
|---|---|---|
| EP | 2 508 331 A1 | 10/2012 |
| JP | 57-182419 A | 11/1982 |
| JP | 2003-33977 A | 2/2003 |
| JP | 2011-101971 A | 5/2011 |

OTHER PUBLICATIONS

International Search Report dated Oct. 14, 2014 of international application PCT/EP2014/066032 on which this application is based.
Written Opinion of the international searching authority dated Mar. 2, 2016 of international application PCT/EP2014/066032 on which this application is based.

* cited by examiner

METHOD FOR MAKING A VEHICLE TIRE

CROSS REFERENCE TO RELATED APPLICATIONS

This application is a continuation application of international patent application PCT/EP2014/066032, filed Jul. 25, 2014, designating the United States and claiming priority from German application 10 2013 221 971.7, filed Oct. 29, 2013, and the entire content of both applications is incorporated herein by reference.

BACKGROUND OF THE INVENTION

In conventional tire construction methods, both sidewalls are wound up on the carcass drum. Subsequently, the tire carcass with the sidewalls which have already been applied is moved to the shaping drum. One disadvantage in the conventional method consists in the fact that certain tire constructions cannot be realized.

The shaping drum is generally of relatively complex construction, since it has to fulfill a plurality of functions. It is known that so-called pusher bells are used on a shaping drum, which pusher bells are to assist turning up of the sidewalls on the tire carcass. The turning up and the connecting of the sidewalls to the tire carcass can be associated with manufacturing inaccuracies on account of various reasons.

SUMMARY OF THE INVENTION

It is an object of the invention to provide an improved method for producing vehicle tires.

By way of the method, in particular, the folding up and connecting of the sidewalls to the tire carcass are to be improved.

The object can, for example, be achieved via a method having the following steps:

a) finishing of a tire carcass on a carcass drum, b) moving and positioning of the tire carcass onto a shaping drum, c) carrying out of the shaping operation, the tire carcass being expanded radially to the outside, d) turning up of the sidewalls which are arranged on the tire carcass by way of inflatable shaping bladders, e) lateral moving of two pusher bells which are arranged laterally with respect to the tire carcass in the direction of the blank center, the pusher bells being mounted in each case on a movable first and second carriage and being moved in the axial direction in each case by way of a first and second drive via a coupling, f) lateral pressing of the pusher bells against the shaping bladders, the shaping bladder being deformed and the turned up sidewalls being pressed against the outer sides of the shaped tire carcass, g) balancing of the pressing positions of the two pusher bells if a force imbalance is set on both sides of the shaping bladders, the drives of the pusher bells being arranged on a freely mounted third carriage, all three carriages being arranged on a rail system such that they can be freely moved together to the blank center, as a result of which the sidewalls on both sides of the tire carcass are connected uniformly to the outer side of the tire carcass, h) finishing of the tire blank by way of further steps.

One advantage of the invention is to be seen in the fact that the manufacturing quality during turning up and connecting of the sidewalls to the tire carcass is improved substantially by way of the method. On account of different material properties of the shaping bladders, a force imbalance can be produced in conventional production methods, which force imbalance firstly deforms the tire blank and secondly loads the mechanism of the shaping head and/or the shaping drum excessively. It can occur, for example on account of an ageing process, that one of the two shaping bladders is inflated to a greater extent when they are pressed together. The force imbalance can be balanced again, in particular, by way of balancing of the pressing position of the two pusher bells. All three carriages are arranged on a rail system such that they can be freely moved together to the blank center, as a result of which a uniform contact pressure can be applied from both sides by way of the displaced pusher bells. In this way, the sidewalls on both sides of the tire carcass are connected uniformly to the outer side of the tire carcass and the manufacturing quality is therefore improved substantially.

It is provided in one advantageous embodiment of the invention that, during the balancing of the force imbalance in step g), the spacing of the pusher bells from one another in the axial direction is substantially maintained.

A uniform contact pressure can be applied on both sides of the shaping bladders as a result.

It is provided in a further advantageous embodiment of the invention that, in step e), the drives for the pusher bells are coupled in each case by way of a first and second drive spindle, the pusher bells being moved in the axial direction via a rotation of the drive spindles.

As a result, the pusher bells can be moved in the axial direction with high accuracy.

It is provided in a further advantageous embodiment of the invention that all three carriages are arranged on a rail system with two guide rails, the carriages being arranged in the axial direction on the guide rails in the form of a floating mounting.

As a result of the use of the guide rails, the pusher bells can be moved in the axial direction with high accuracy. Moreover, the floating mounting can be implemented simply and with high accuracy by way of the guide rails.

It is provided in a further advantageous embodiment of the invention that a balancing means is arranged on the third carriage, the displacement movement of the center offset of the two pusher bells in relation to the blank center being regulated by way of the balancing means in step g).

In this way, overmodulation of the displacement movement of the pusher bells is counteracted.

It is provided in a further advantageous embodiment of the invention that the balancing means is a servomotor with a ball screw drive.

The balancing can be carried out with high accuracy by way of the servomotor and the ball screw drive.

It is provided in a further advantageous embodiment of the invention that the ball screw drive is coupled to the third carriage via a coaxially arranged thread.

Direct force coupling to the third carriage can be achieved as a result of this.

It is provided in a further advantageous embodiment of the invention that, in step g), a counteracting counterforce is applied to the third carriage by way of the servomotor if a limit value for the center offset of the two pusher bells is exceeded. As a result, the servomotor is not activated until a predefined center offset is exceeded.

It is provided in a further advantageous embodiment of the invention that, in step g), the limit value for the center offset is from 2 to 10 mm.

Optimum regulation for the servomotor can be started when the limit value is reached.

It is provided in a further advantageous embodiment of the invention that, in step g), the distance measurement of the center offset of the pusher bells takes place by way of a sensor which is arranged in the servomotor.

As a result of this, the center offset of the pusher bells can be regulated more simply by way of the servomotor.

It is provided in a further advantageous embodiment of the invention that, in step g), in each case the spacings of the pusher bells from one another and the spacings of the pusher bells in relation to the blank center are measured, monitored and/or regulated.

Optimum regulation of the center offset of the pusher bells can be achieved in this way.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
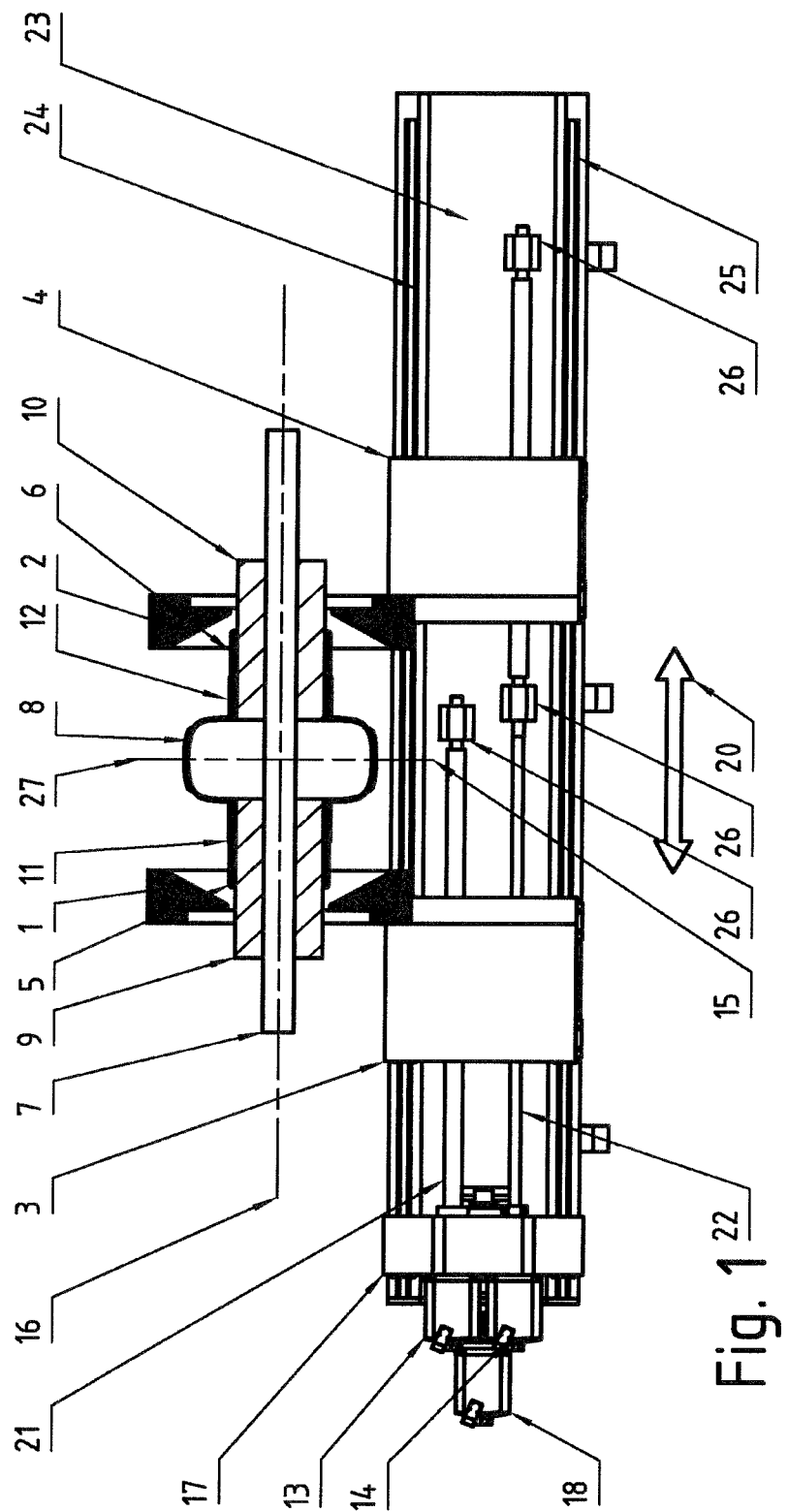
FIGS. 1 to 3 show one exemplary embodiment of the method.

FIG. 1 shows the shaping station with the shaping drum and the left-hand and right-hand shaping head 9 and 10 in a sectional view. The tire carcass 8 is shown in a shaped state and is held by way of the shaping heads 9 and 10. The left-hand and right-hand sidewall 11 and 12 in each case lie on a left-hand and a right-hand shaping bladder 5 and 6, the shaping bladders being shown in the non-inflated state. It is likewise conceivable that another insert end lies over the sidewalls 11 and 12, which insert end is likewise to be turned up with the sidewalls. A left-hand pusher bell 1 and a right-hand pusher bell 2 are arranged in each case in a waiting position on both sides of the tire carcass 8. The shaping drum is driven, in particular, by way of the drum shaft 7 which rotates about the center axis 16 of the drum shaft. The pusher bells 1 and 2 are arranged in each case on a movable carriage 3 and 4. The carriages are held via the rail system 23 with an upper guide rail 24 and a lower guide rail 25. The two carriages 3 and 4 are moved toward one another in the axial direction 20, in order to assist the turning up of the sidewalls as a result. The second carriage 3 is driven by way of the drive 13 via the drive spindle 21. The drive spindle 21 is held on the opposite side by way of a bearing 26. Upon rotation of the drive spindle 21, the carriage 3 moves in the axial direction 20 to the left or to the right. Upon a rotational movement of the drive spindle 22, the carriage 4 likewise moves in the axial direction 20 to the left or right. The drive spindle 22 is guided through the carriage 3 and is mounted at two positions via the bearing 26. The drive spindle 22 is driven by the servomotor 14. The servomotors 13 and 14 are mounted with the drive spindles 21 and 22 on a third carriage 17. The third carriage 17 is in turn arranged movably on the rail system 23 such that it can be moved in the axial direction. In this way, all three carriages 17, 3 and 4 are arranged such that they can be moved together to the blank center 15. As a result, floating mounting of the two pusher bells 1 and 2 in relation to the blank center 15 is realized. The servomotor 18 is arranged on the third carriage 17 and has the function of a balancing means in the case of overmodulation of the center offset of the left-hand or right-hand pusher bell 1 and 2.

Figure 2:
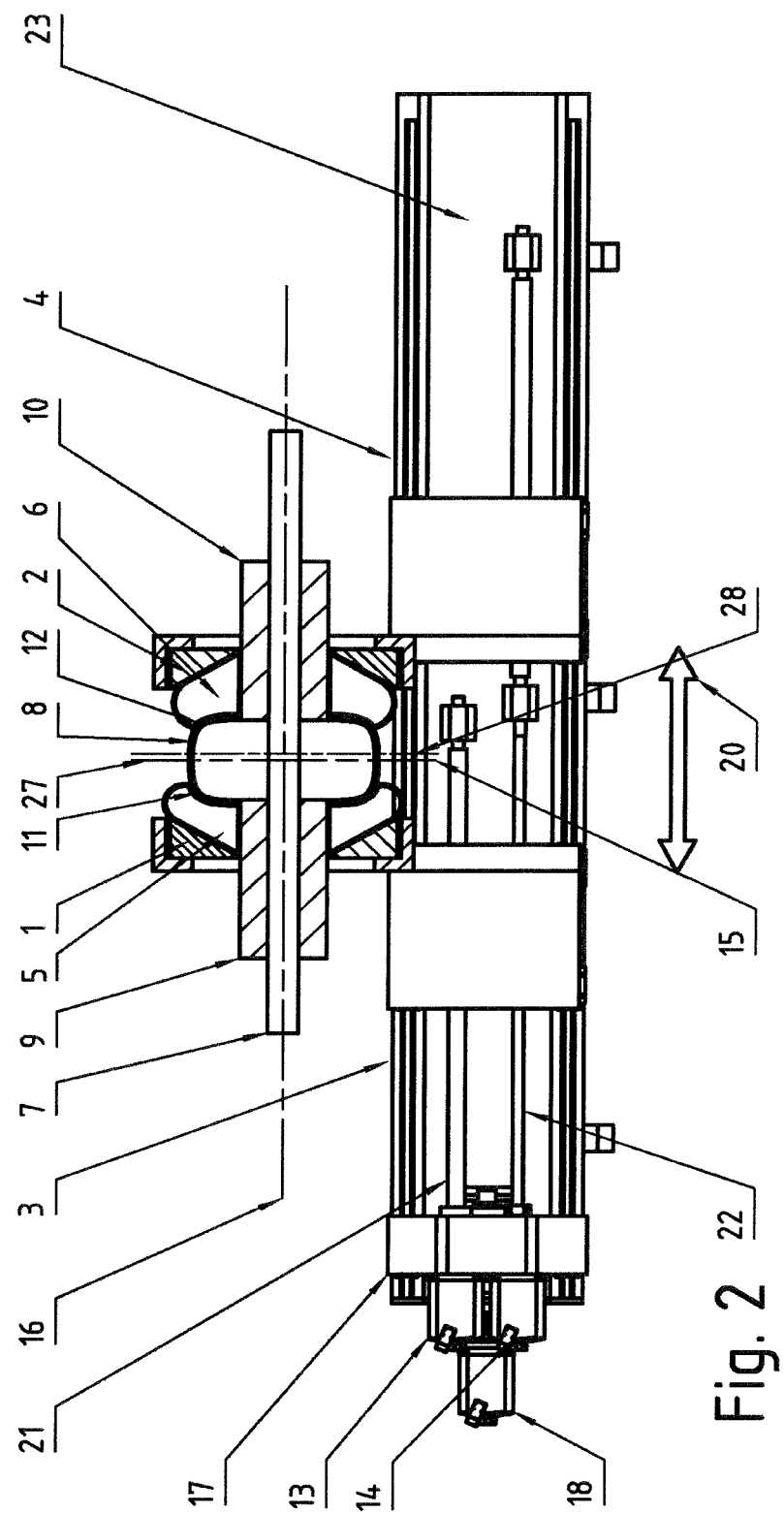

FIG. 2 shows the method step in which the sidewalls 11 and 12 are turned up on the tire carcass 8 by way of the inflated shaping bladders 5 and 6. During this procedure, the two pusher bells 1 and 2 are moved in the axial direction to the blank center 15, with the result that the pusher bells press against the inflated shaping bladders and, as a result, the upper ends of the sidewalls are likewise pressed against the tire carcass 8. The figure shows a state in which a force imbalance has been produced on account of a different quality of the bladders. The left-hand side shaping bladder 5 can be compressed more than the right-hand shaping bladder 6. A center offset of the two pusher bells 1 and 2 in relation to the original blank center 15 takes place on account of the force imbalance. As a result of the balancing of the center offset, the line of symmetry of the pusher bells 27 after the center offset migrates to the left in the axial direction 20. During this procedure, the spacing in the axial direction between the two pusher bells 1 and 2 is substantially maintained. The center offset of the two pusher bells 1 and 2 takes place by way of the floating mounting of the three carriages which are arranged on the rail system 23. During the center offset, all three carriages 17, 3 and 4 move in the same direction, the spacing from one another being maintained. All three carriages are coupled to one another in terms of their movement by way of the rail system 23 and by way of the drive spindles 21 and 22.

The center offset can be regulated by way of the servomotor 18 in the case of overmodulation. FIG. 2 substantially shows the state in which the force balance is established again. The two pushers 1 and 2 are positioned asymmetrically with respect to the blank center 15, and the shaping bladders rise up to different extents around the tire blank which is shown. In the normal case, this type of balancing can be used in an optimum manner in order for it to be possible to turn up the sidewalls uniformly on both sides. If, however, the force difference on both sides is too great, it can occur that the sidewall 12 on the side with the greater contact pressure is not turned up completely or the case can occur, however, that the pusher bell 1 on the side with the weaker pressure is pressed against the carcass 8. In order to counteract a state of this type, a servomotor 18 is arranged on the third carriage as balancing means.

Figure 3:
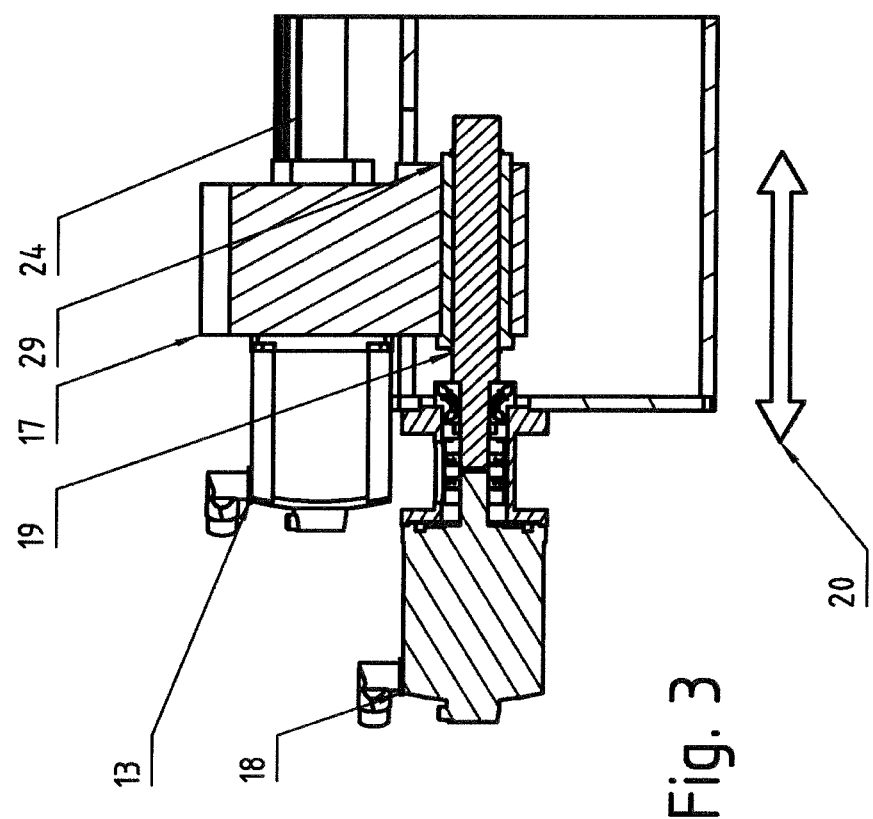

FIG. 3 shows the servomotor 18 with the ball screw drive 19. A counterforce can be applied to the third carriage 17 by way of the ball screw drive 19. Overmodulation of the center offset can be counteracted by way of the counterforce. A thread 29 which is connected to the third carriage 17 is arranged coaxially with respect to the ball screw drive 19. The third carriage 17 is arranged on the upper rail 24 such that it can be moved freely.

It is understood that the foregoing description is that of the preferred embodiments of the invention and that various changes and modifications may be made thereto without departing from the spirit and scope of the invention as defined in the appended claims.

REFERENCE NUMERALS (Part of the Description)
1 Left-hand pusher bell
2 Right-hand pusher bell
3 Second carriage
4 First carriage
5 Left-hand shaping bladder for sidewall and/or carcass insert end
6 Right-hand shaping bladder for sidewall and/or carcass insert end 7 Shaft for shaping drum
8 Shaped tire carcass
9 Left-hand shaping head
10 Right-hand shaping head
11 Left-hand sidewall
12 Right-hand sidewall
13 Drive for second carriage
14 Drive for first carriage
15 Blank center in the starting position
16 Center axis of the drum shaft
17 Third carriage
18 Servomotor for the third carriage
19 Ball screw drive
20 Axial direction
21 Second drive spindle for second carriage
22 First drive spindle for first carriage
23 Rail system
24 Upper guide rail
25 Lower guide rail
26 Bearings for drive spindles
27 Original line of symmetry of the pusher bells
28 Line of symmetry of the pusher bells after center offset
29 Thread

What is claimed is:

1. A method for making a vehicle tire having a tire carcass having an outer side, side walls arranged on the tire carcass, tire beads having cores, a tire belt and a tread, the method comprising the steps of:
   a) finishing a tire carcass on a carcass drum;
   b) moving and positioning the tire carcass on a shaping drum;
   c) performing a shaping process wherein the tire carcass is expanded;
   d) turning up the side walls arranged on the tire carcass via inflatable shaping bladders;
   e) laterally moving a first and a second pusher bell arranged laterally with respect to the tire carcass in the direction of a tire blank center, the first pusher bell being mounted on a first movable carriage and configured to be driven by a first drive, the second pusher bell being mounted on a second movable carriage and configured to be driven by a second drive, the first and second pusher bells being coupled to the first and second drives, respectively, and the first and second pusher bells thereby are configured to be movable;
   f) laterally pressing the first and second pusher bells against the shaping bladders, the shaping bladders being deformed and the turned up sidewalls being pressed against the outer sides of the shaped tire carcass, thereby creating a force imbalance on both sides of the shaping bladders;
   g) balancing the force imbalance by balancing the pressing positions of the first and second pusher bells, the first and second drives of the pusher bells being arranged on a mounted third carriage that is freely movable, the first, second and third carriages being arranged on a rail system such that they are freely moved together laterally, as a result of which the force imbalance is balanced and the sidewalls on both sides of the tire carcass are connected uniformly to the outer side of the tire carcass; and,
   h) finishing the vehicle tire.

2. The method of claim 1, wherein during the balancing of the force imbalance in step g), the mutual spacing of the pusher bells from one another in an axial direction is substantially maintained.

3. The method of claim 1, wherein the first drive for the first pusher bell is coupled to the first pusher bell via a first drive spindle and the second drive for the second pusher bell is coupled to the second pusher bell via a second drive spindle, and, in step e) said first pusher bell is moved in an axial direction via a rotation of the first drive spindle and the second pusher bell is moved in the axial direction via a rotation of the second drive spindle.

4. The method of claim 1, wherein the rail system has two guide rails and the first, second and third carriages are arranged in an axial direction on the guide rails in a floating mounting.

5. The method of claim 1, wherein a balancing device is arranged on the third carriage, and, in step g) a displacement movement of a center offset of the first and the second pusher bells in relation to the tire blank center is regulated via the balancing device.

6. The method of claim 5, wherein the balancing device is a ball screw drive.

7. The method of claim 6, wherein the ball screw drive is coupled to the third carriage via a coaxially arranged thread.

8. The method of claim 1, wherein in step g), a counteracting counterforce is applied to the third carriage via a servomotor if a limit value for a center offset of the two pusher bells is exceeded.

9. The method of claim 8, wherein in step g), the limit value for the center offset lies in a range from 2 to 10 millimeters.

10. The method of claim 8, wherein in step g), a distance measurement of the center offset of the first and second pusher bells takes place via a sensor arranged in the servomotor.

11. The method of claim 1, wherein the first and second pusher bells define a first spacing between each other, the first pusher bell defines a second spacing to the tire blank center and the third pusher bell defines a third spacing to the blank center; and, in step g), the first, second and third spacings are each at least one of measured, monitored, and regulated.

* * * * *